United States Patent
Nahle et al.

(10) Patent No.: US 10,878,704 B2
(45) Date of Patent: Dec. 29, 2020

(54) VEHICLE AUDIT MANAGEMENT SYSTEM

(71) Applicant: Ford Global Technologies, LLC, Dearborn, MI (US)

(72) Inventors: Wassim Mahmoud Nahle, Dearborn Heights, MI (US); Catherine Duluc, Dearborn, MI (US); Thomas Steiner, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/387,104

(22) Filed: Apr. 17, 2019

(65) Prior Publication Data
US 2020/0334989 A1 Oct. 22, 2020

(51) Int. Cl.
| G08G 1/123 | (2006.01) |
| G08G 1/00 | (2006.01) |
| G07C 5/00 | (2006.01) |
| G05D 1/00 | (2006.01) |
| G05D 1/02 | (2020.01) |

(52) U.S. Cl.
CPC ........... *G08G 1/207* (2013.01); *G05D 1/0088* (2013.01); *G05D 1/0276* (2013.01); *G07C 5/008* (2013.01); *G05D 2201/0213* (2013.01)

(58) Field of Classification Search
CPC .... G08G 1/207; G05D 1/0088; G05D 1/0276; G05D 2201/0213; G07C 5/008
USPC ........................................................ 340/988
See application file for complete search history.

(56) References Cited

U.S. PATENT DOCUMENTS

| 5,214,313 | A | * | 5/1993 | Windes | ................... | H02M 1/32 |
| | | | | | | 307/109 |
| 8,214,313 | B1 | * | 7/2012 | Puskorius | ............ | G06Q 10/087 |
| | | | | | | 706/28 |
| 9,378,480 | B2 | | 6/2016 | Morgan et al. | | |
| 10,055,708 | B2 | | 8/2018 | Kakarala et al. | | |
| 10,134,003 | B1 | * | 11/2018 | Loyens | ................. | G06Q 10/087 |
| 2002/0032626 | A1 | * | 3/2002 | DeWolf | ................. | G06Q 10/06 |
| | | | | | | 705/35 |
| 2002/0186144 | A1 | * | 12/2002 | Meunier | ................. | G07B 15/00 |
| | | | | | | 340/4.6 |
| 2002/0195490 | A1 | * | 12/2002 | Gehlot | ................... | B60R 13/10 |
| | | | | | | 235/384 |
| 2005/0179518 | A1 | * | 8/2005 | Kawamura | ............... | G07C 9/27 |
| | | | | | | 340/5.23 |
| 2007/0023509 | A1 | * | 2/2007 | Kusunoki | ........... | B60C 23/0416 |
| | | | | | | 235/384 |
| 2008/0010561 | A1 | * | 1/2008 | Bay | .......................... | G06F 9/466 |
| | | | | | | 714/49 |

(Continued)

OTHER PUBLICATIONS

Duden, Chris, "Why Automated Audit Management System is Important?", 360 Factors, Sep. 29, 2017, 7 Pages.

*Primary Examiner* — Kerri L McNally
*Assistant Examiner* — Thang D Tran
(74) *Attorney, Agent, or Firm* — Michael Spenner; Brooks Kushman PC

(57) ABSTRACT

A server includes a processor, configured to responsive to verifying a location of a vehicle associated with a dealership is outside a predefined geofence, request to obtain electronic paperwork stored in the vehicle; and responsive to detecting the electronic paperwork fails to reflect a predefined transaction, raise a flag for the vehicle and send an autonomous driving instruction to the vehicle to direct the vehicle to a predefined location.

18 Claims, 3 Drawing Sheets

(56) References Cited

U.S. PATENT DOCUMENTS

| | | | |
|---|---|---|---|
| 2008/0147245 A1* | 6/2008 | Koepf | G06F 11/25 701/1 |
| 2008/0262885 A1* | 10/2008 | Jain | G06Q 10/08 705/7.27 |
| 2009/0015373 A1* | 1/2009 | Kelly | B60R 25/2081 340/5.62 |
| 2010/0094482 A1* | 4/2010 | Schofield | G08G 1/205 701/2 |
| 2011/0227709 A1* | 9/2011 | Story | B60R 25/102 340/10.42 |
| 2011/0264916 A1* | 10/2011 | Fischer | G07C 5/008 713/175 |
| 2012/0174193 A1* | 7/2012 | Dietrich | G06F 21/34 726/4 |
| 2013/0138591 A1* | 5/2013 | Ricci | B60W 50/0098 706/46 |
| 2013/0311211 A1* | 11/2013 | Zafar | G06Q 10/02 705/5 |
| 2014/0279293 A1* | 9/2014 | Morgan | G06Q 10/087 705/28 |
| 2015/0346727 A1* | 12/2015 | Ramanujam | B62D 15/0285 701/23 |
| 2016/0012465 A1* | 1/2016 | Sharp | G06Q 20/10 705/14.17 |
| 2016/0071054 A1* | 3/2016 | Kakarala | G06Q 10/0875 705/28 |
| 2016/0140844 A1* | 5/2016 | Njihia | G08G 1/127 340/989 |
| 2017/0187707 A1* | 6/2017 | Miu | H04W 12/0602 |
| 2018/0307825 A1* | 10/2018 | O'Hearn | G06F 21/85 |
| 2019/0011931 A1* | 1/2019 | Selvam | G05D 1/0291 |
| 2019/0026690 A1* | 1/2019 | Wappler | G06Q 10/10 |
| 2019/0056728 A1* | 2/2019 | Lisewski | G07C 5/008 |
| 2019/0124477 A1* | 4/2019 | Shipley | G07C 5/008 |
| 2019/0138990 A1* | 5/2019 | Alezzani | G06Q 10/10 |
| 2019/0193724 A1* | 6/2019 | Kim | B60W 30/06 |
| 2019/0213684 A1* | 7/2019 | Sundar Singh | H04W 4/42 |
| 2019/0236510 A1* | 8/2019 | Kwak | G07C 5/008 |
| 2019/0295030 A1* | 9/2019 | Candeloro, Jr. | G06F 9/547 |

* cited by examiner

VEHICLE AUDIT MANAGEMENT SYSTEM

TECHNICAL FIELD

The present disclosure generally relates to a vehicle inventory audit management system. More specifically, the present disclosure relates to an audit management system using geofence technology.

BACKGROUND

Many automobile manufacturers ship vehicles to franchised dealerships to sell the vehicles to customers. The number of vehicles at each dealership may vary depending on the size of the dealership. A small dealership may have an inventory size around ten to twenty vehicles, whereas a large dealership may have hundreds of vehicles in its inventory at a time. Manufacturers may conduct vehicle audits on dealerships periodically to verify each vehicle within such dealership is accounted for (e.g. not stolen or misused). For a large dealership having hundreds of vehicles, a manually conducted audit may be difficult to implement.

SUMMARY

In one or more illustrative embodiments of the present disclosure, a server includes a processor, configured to responsive to verifying a location of a vehicle associated with a dealership is outside a predefined geofence, request to obtain electronic paperwork stored in the vehicle; and responsive to detecting the electronic paperwork fails to reflect a predefined transaction, raise a flag for the vehicle and send an autonomous driving instruction to the vehicle to direct the vehicle to a predefined location.

In one or more illustrative embodiments of the present disclosure, a method for audit a dealership includes identifying a plurality of vehicles associated with the dealership using a database configured to document vehicle shipments to the dealership; sending a request for vehicle status to the plurality of vehicles as identified; receiving the vehicle status including vehicle locations from the plurality of vehicles; verifying if the vehicle location of each vehicle as identified is within a predefined geofence; and responsive to verifying a fleet vehicle of the plurality of vehicles having a vehicle location outside the predefined geofence, request to obtain an electronic paperwork stored in the fleet vehicle.

In one or more illustrative embodiments of the present disclosure, a non-transitory computer-readable medium includes instructions, when executed by a processor of a server, making the server to identify a vehicle associated with a dealership to be audited via a database; request for vehicle status of the vehicle as identified via a wireless network; receive the vehicle status including vehicle locations from the vehicle as requested; responsive to verifying the vehicle location is outside a predefined geofence associated with the dealership, request to obtain an electronic paperwork stored in the vehicle; responsive to receiving the electronic paperwork from the vehicle, verify a transaction status of the vehicle; and responsive to verifying a suspicious transaction status, rising a flag for the vehicle.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle audit system. More specifically, the present disclosure proposes a vehicle audit system using geofence technology.

Figure 1:
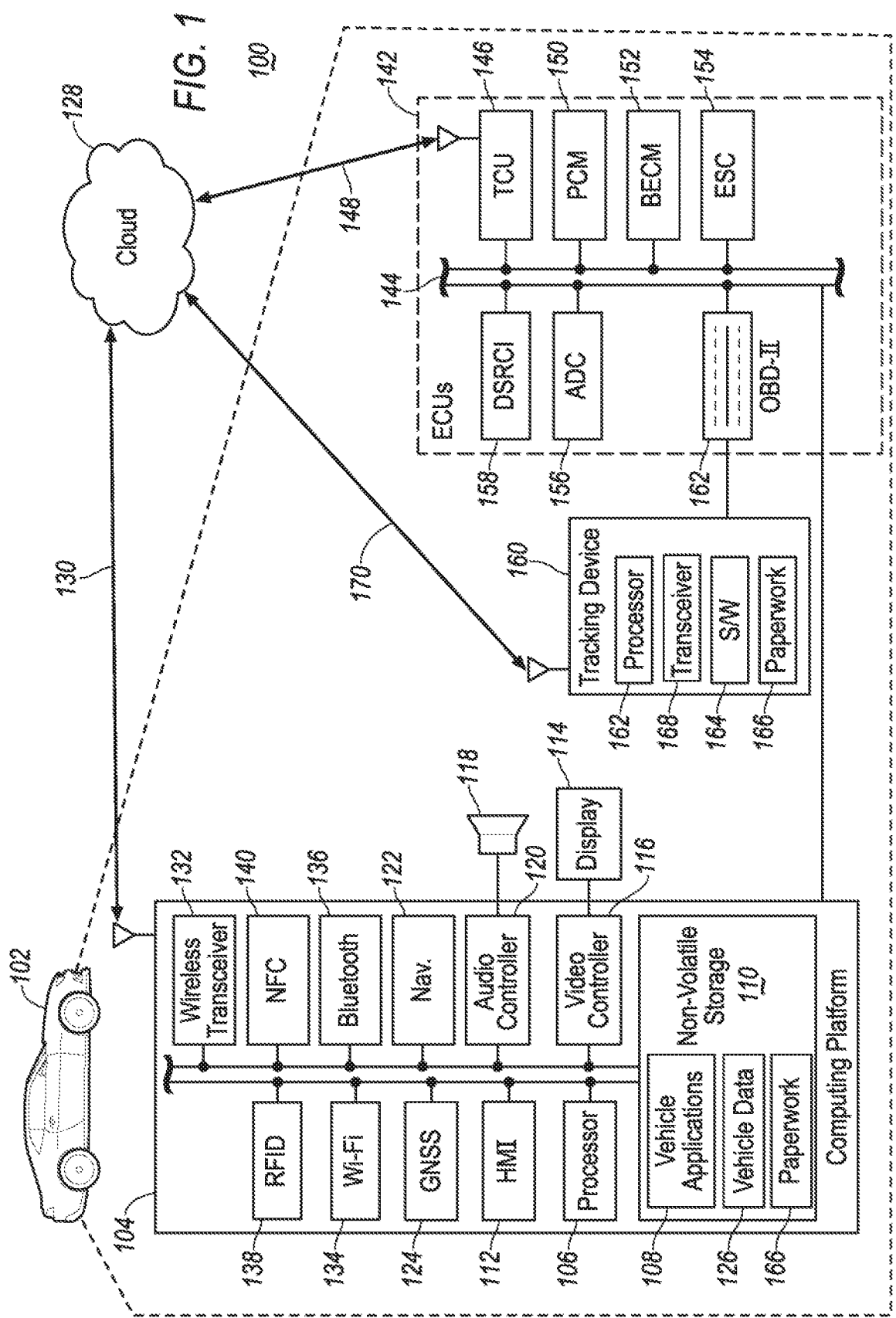
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, wireless communications, and remote audit. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 e.g. as one of the vehicle applications 108.

The computing platform 104 may be configured to wirelessly connect to a cloud 128 via a wireless connection 130 through a wireless transceiver 132. The wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless access point or transceiver (not shown) connected to the cloud 128. The cloud 128 may include one or more servers, or computers connected via various types of wired or wireless networks (e.g. Internet). It is noted that the term cloud is used as a general term throughout the present disclosure and may refer to any cloud-based devices or services involving multiple servers, computers, devices, or the like, each having one or more processors or controllers programmed to perform various operations.

The computing platform 104 may be further configured to communicate various electronic control units (ECUs) 142 via one or more in-vehicle network 144. The in-vehicle network 144 may include, but is not limited to, one or more of a controller area network (CAN), an Ethernet network, and a media-oriented system transport (MOST), as some examples.

The ECUs 142 may include various devices and components to provide various features. For instance, the ECUs 142 may include a telematics control unit (TCU) 146 configured to control telecommunication between the vehicle 102 and the cloud 128 through a wireless connection 148 using a modem (not shown). The TCU 146 may be configured to connect to the cloud via a cellular network. The ECUs 142 may further include a powertrain control module (PCM) 150 configured to monitor and control the powertrain operation of the vehicle 102. For instance, the PCM 150 may be configured to provide features such as the stop/start of an engine (not shown), and/or the driving mode (e.g. economic, normal, or sport) of the vehicle 102. The ECUs 142 may further include a battery electric control module (BECM) 152 configured to monitor and control vehicle traction battery operations of the vehicle 102 in case that the vehicle 102 is an electrified vehicle such as a hybrid vehicle or BEV. For instance, the BCM 152 may be configured to control and monitor a battery state of charge (SOC), battery health or the like of the vehicle 102.

The ECUs 142 may further include an electronic stability controls (ESC) 154 configured to control the stability of the vehicle operation whenever needed such as by activating anti-lock brakes (ABS), traction controls or the like. The ECUs 142 may further include an autonomous driving controller (ADC) 156 configured to provide the autonomous driving features of the vehicle 102. Some autonomous driving feature may include lane keep assist, safe distance from other vehicles, cruise control, hands-off-wheel alert, autobraking, brake mitigation with multiple sensitivity levels or the like. Instructions of autonomous driving may be set to the ADC 156 from the computing platform 104. Alternatively, the autonomous driving instructions may be received remotely from the cloud 128. The ECUs 142 may further include a dedicated short-range communication (DSRC) controller 158 configured to wirelessly communicate with compatible controllers of other vehicles or digital entities (not shown).

The vehicle 102 may be further provided with a tracking device 160 connected to the in-vehicle network 144 via a connecting port such as an on-board diagnostic II (OBD-II) connector 168. The tracking device 160 may be configured to communicate with the computing platform 104 as well as various ECUs 142. The tracking device 160 may be provided with a processor 162 configured to execute commands and instructions of software 164 to perform various operations including telecommunication and read/store data from/ to the storage 110. For instance, digitized or electronic vehicle paperwork 166 may be stored in the storage 110 and configured to be accessible to the tracking device 160 and the computing platform 104. The paperwork 166 may include a digital version of vehicle title, a certificate of origin of vehicle (COV), and/or a window sticker of the vehicle 102. The paperwork 166 may further include digital vehicle registration, insurance documents or the like. The tracking device 160 may be further provided with wireless communication capability via a wireless transceiver 168 configured to communicate with the cloud via a wireless connection 170. As an example, the tracking device 160 may be remotely operated by the vehicle manufacturer or a fleet manager via the cloud 128 to track the location and status of the vehicle 102. The tracking device 160 may be provided location features through a GNSS controller or the like (not shown). Additionally, the tracking device 160 may be provided with storage configured to store vehicle paperwork 166 in addition to or in lieu of the electronic paperwork 166 stored in the storage 110. It is noted that depending on the specific implementation of the present disclosure, the tracking device 160 may be optional and operations of the process may be performed by the computing platform 104 in communication with the cloud 128 via the wireless transceiver 132 and/or via the TCU 146.

Figure 2:
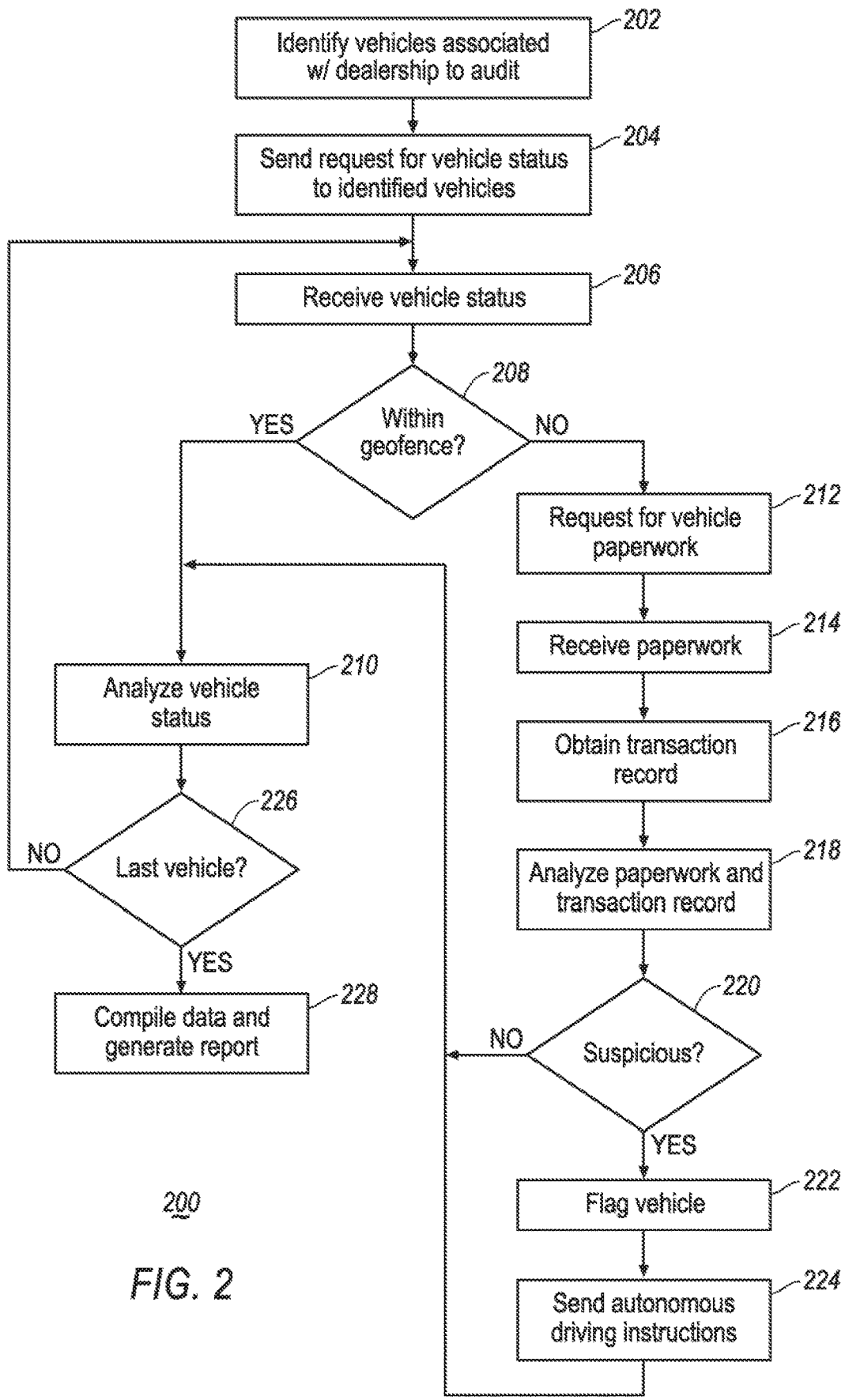
FIG. 2 illustrates an example flow diagram of one embodiment of the present disclosure.

Referring to FIG. 2, a flow diagram for a dealership audit process 200 of one embodiment of the present disclosure is illustrated. At operation 202, a vehicle manufacturer or an audit agent starts the audit process via a cloud server 128 by identifying vehicles associated with the dealership to be audited. Although it is possible to audit multiple dealerships at the same time, only one dealership is audited in the present example for the simplicity of the description. The identification of vehicles may be conducted using a database in the cloud 128. For instance, the database may record vehicle orders for dealerships for each vehicle before the vehicle is shipped.

After identifying the vehicles associated with the dealership, at operation 204, the cloud server 128 sends a request for vehicle status to each vehicle that has been identified at operation 202. The requested vehicle status may include various data. For instance, the vehicle status may include vehicle location determined via the GNSS controller 124, vehicle battery SOC from the BECM 152, tire pressure detected via a tire pressure sensor (not shown), vehicle fuel level, vehicle temperature, warnings, days at dealership, as well as various other data indicative of the condition of the vehicle 102. At operation 206, the cloud server 128 receives the requested vehicle status from the vehicle 102. The vehicle 102 may be configured to communicate with the cloud 128 via the wireless transceiver 132 or the TCU 146. Alternatively, in situation such as the vehicle 102 is not provided those components enabling telecommunication features, the vehicle 102 may be provided with the tracking device 160 connected to the in-vehicle network 144 via the OBD-II port 162 to communicate with the cloud 128.

Responsive to receiving the vehicle status including the location of the vehicle 102, at operation 208, the cloud server 128 verifies if the vehicle 102 is within a predefined geofence associated with the dealership. Each dealership may be assigned to or associated with a geofence within which inventory vehicles are designated to be. For instance, the geofence may cover all facilities including buildings, parking lots, or service driveways associated with the dealership. Additionally, the geofence may further cover public roads used by the dealership for various purposes such as test drives. Responsive to verifying the vehicle 102 is located within the predefined geofence, the process proceeds to operation 210 and the cloud server 128 analyzes the vehicle status to evaluate the dealership. Otherwise, if the cloud server 128 detects the vehicle 102 is outside the geofence at operation 208, the process proceeds to operation 212. The cloud server 128 further requests the vehicle 102 to send the vehicle paperwork 166 to verify the legal status. At operation 214, the cloud server 128 receives the paperwork 166 from the vehicle 102. For instance, the reason that the vehicle 102 is outside the geofence could simply be that the vehicle 102 has been sold or leased to a customer. Due to the delay of the transaction procedures, the databased used for identification at operation 202 may not have been updated yet, but still identifies the vehicle 102 to be associated with the dealership. However, the paperwork 166 stored in the storage 110 may have already been instantly updated when the transaction is performed.

Additionally or alternatively, the vehicle transaction may be also recorded by the dealership and a transaction record may be stored in a system associated with the dealership. At operation 216, the cloud server 128 requests and obtains transaction record for the vehicle 102 from the dealer transaction system via a cloud. At operation 218, the cloud server 128 analyzes the paperwork 166 from the vehicle 102 and/or the transaction record (if there is any) from the dealership to verify the legal status of the vehicle 102. If the cloud server 218 verifies the vehicle 102 has been transacted (e.g. sold, leased or transferred to another dealer), the process proceeds from operation 220 to operation 210. Otherwise, the process proceeds to operation 222 to raise a flag for the vehicle 102. The cloud server 128 may flag the vehicle 102 as a missing vehicle and report the situation to the manufacturer or the dealership for manual verification. In case that the vehicle 102 is provided with autonomous driving features, at operation 224, the cloud server 128 may further send autonomous driving instructions to the vehicle 102 to direct the vehicle 102 to a predefined location for manual verification (e.g. a dealership, or law enforcement agency). Alternatively, the cloud server 128 may send a message/notice to the vehicle 102 to output via the display 114 or the speaker 118 to invite the current user of the vehicle 102 to contact the manufacturer to clarify the situation.

At operation 210, the cloud server 128 analyzes the vehicle status using a predefined algorithm. For instance, since the vehicle status received at operation 206 include various information such as days at dealership, vehicle features, or the like, the cloud server 128 may use such information to evaluate the dealership for future vehicle shipments. Additionally, the cloud server 128 may evaluate the dealership using the total number of flagged vehicles. At operation 226, the cloud server 128 checks if the vehicle 102 is the last vehicle of the dealership to be audited. Responsive to determining the vehicle 102 is not the last vehicle and there are other vehicles to be analyzed, the process returns to operation 206. Otherwise the process proceeds to operation 228 and the cloud server 128 compiles all data collected to generate an audit report for the dealership.

Figure 3:
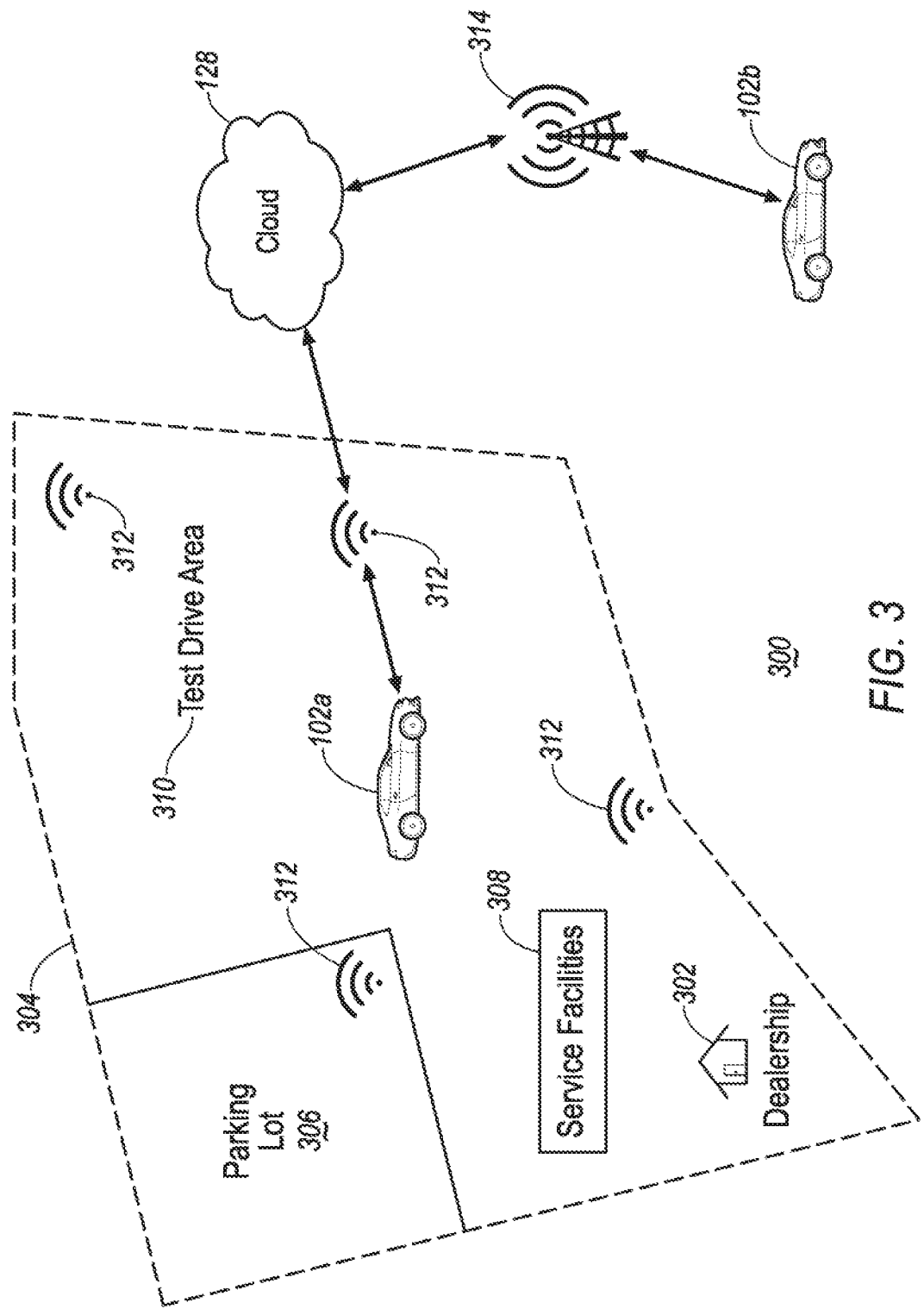
FIG. 3 illustrates an example schematic diagram of one embodiment of the present disclosure.

Referring to FIG. 3, a schematic diagram 300 of one embodiment of the present disclosure is illustrated. With continuing reference to FIGS. 1 and 2, as illustrated in FIG. 3, a dealership 302 is associated with a geofence 304 covering one or more predefined area. The geofence 304 may be predefined by the manufacturer or the dealership 302 to cover an area designated to inventory vehicles before sold. For instance, the geofence 304 may cover a dealership building 302, a parking lot 306, one or more service facilities 308, a test drive area 310 (including private or public road), and any adjacent area therebetween. One or more wireless connection access points 312 may be provided to cover a part or the entire geofence 304 to facilitate inventory vehicles to connect to the cloud 128. The access points 312 may involve any wireless connection technologies supported by the wireless transceiver 132 of the computing platform 104 or the wireless transceiver 168 of the tracking device. For instance, the access points 312 may include one or more Wi-Fi access points. Although may inventory vehicles 102 may be provided a TCU 146 to support a wireless wide area network (WWAN) such as a cellular network 314, using the WWAN may potentially incur extra charges. Therefore, the vehicles 102 are preferably connected to the cloud 128 using the access points 312 when available.

As illustrated in FIG. 3, a vehicle 102a is within the geofence 304 when the request for vehicle status is received. In case that the vehicle 102a is provided with the wireless transceiver 132 and/or the TCU 146 to enable wireless communication features, the tracking device 160 may be unnecessary. However, the vehicle 102a may still be provided with the tracking devices 160 to provide some redundancy. Responsive to receiving the request, the vehicle 102a may collect the requested status from various ECUs 142 via the in-vehicle network 144, and send the status data to the cloud server 128 via the access point 312. Since the vehicle 102a is within the geofence, no further actions may be needed on the vehicle 102a side after the transmitting the requested status data.

For a second vehicle 102b, the process operations may be different as the vehicle 102b is outside the geofence 304 when audit process is performed. Because the vehicle 102b is out of the range supported by the access point 312, the vehicle 102b may be connected to the cloud 128 via a cellular network 314 through the TCU 146. The vehicle 102b may receive the request for paperwork after the cloud server 128 detects the location is outside the geofence 304. In response, the vehicle 102b may load the electronic paperwork 166 and transmit the paperwork 166 to the cloud server 128. If the cloud server 128 determines a suspicious status of the vehicle 102b, the vehicle 102b may be flagged as a suspicious vehicle. Additionally, a navigation and autonomous driving instruction may be sent to the vehicle 102b to direct the vehicle to a predefined location such as a dealership nearby or a law enforcement agency to facilitate a manually conducted evaluation of the situation. In response, the vehicle 102b operates to the predefined location using the instructions via the ADC 156.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A server, comprising:
    a processor, configured to
        responsive to identifying a vehicle associated with a dealership to be audited, send a request for vehicle status to the vehicle,
        responsive to receiving the vehicle status including a vehicle location, verify the vehicle location against a predefined geofence,
        responsive to verifying a location of a vehicle is beyond the geofence, request to obtain electronic paperwork stored in the vehicle, the electronic paperwork including a vehicle title, a vehicle registration, and an insurance document, and
        responsive to detecting the electronic paperwork fails to reflect a predefined transaction permitting the vehicle to go beyond the geofence, raise a flag for the vehicle and send an autonomous driving instruction to the vehicle to direct the vehicle to a predefined location.

2. The server of claim 1, wherein the vehicle status further includes at least one of: a vehicle battery state-of-charge, a tire pressure, a vehicle fuel level, a vehicle temperature, warnings, or days at the dealership.

3. The server of claim 2, wherein the processor is further configured to
    responsive to receiving the vehicle status data, analyze the vehicle status data, and
    compile the vehicle status data received from multiple vehicles and generate an audit report.

4. The server of claim 1, wherein the electronic paperwork further includes a certificate of origin of vehicle.

5. The server of claim 1, wherein the processor is further configured to
    obtain a transaction record for the vehicle from a system associated with the dealership; and
    verify the transaction record against the electronic paperwork.

6. The server of claim 1, wherein the processor is further configured to identify the vehicle associated with the dealership using a database from a cloud.

7. The server of claim 1, wherein the processor is further configured to responsive to rising the flag, send a message to the vehicle via a wireless connection.

8. The server of claim 1, wherein the processor is further configured to communicate with the vehicle via a tracking device connected to an in-vehicle network of the vehicle.

9. The vehicle of claim 1, wherein the processor is further configured to responsive to rising the flag for the vehicle, inform the dealership about a vehicle status of the vehicle.

10. A method for auditing a dealership, comprising:
    identifying a plurality of vehicles associated with the dealership using a database configured to document vehicle shipments to the dealership;
    sending a request for vehicle status to the plurality of vehicles as identified;
    receiving the vehicle status including vehicle locations from the plurality of vehicles;
    verifying if the vehicle location of each vehicle as identified is within a predefined geofence;
    responsive to verifying a fleet vehicle of the plurality of vehicles having a vehicle location outside the predefined geofence, request to obtain an electronic paperwork stored in the fleet vehicle, the electronic paperwork including a vehicle title, and a vehicle registration; and
    responsive to detecting the electronic paperwork fails to reflect a predefined transaction permitting the vehicle to go beyond the geofence, rising a flag for the fleet vehicle and sending an autonomous driving instruction to the vehicle to direct the vehicle to a predefined location.

11. The method of claim 10, further comprising receiving the electronic paperwork from the fleet vehicle; obtaining a transaction record of the fleet vehicle from a system associated with dealership; and analyze the electronic paperwork and the transaction record to identify the predefined transaction.

12. The method of claim 11, further comprising:
responsive to rising the flag for the fleet vehicle, send a message to the vehicle via a wireless connection.

13. The method of claim 11, further comprising:
responsive to rising the flag for the fleet vehicle, informing the dealership about a situation of the fleet vehicle.

14. The method of claim 11, wherein the vehicle status further includes at least one of: a vehicle battery state-of-charge, a tire pressure, a vehicle fuel level, a vehicle temperature, warnings, or days at the dealership.

15. The method of claim 14, further comprising:
analyzing the vehicle status of the fleet vehicle, and
compiling the vehicle status received from the plurality of vehicles to generate an audit report.

16. The method of claim 11, wherein the electronic paperwork further includes a certificate of origin of the vehicle, and an insurance.

17. A non-transitory computer-readable medium, comprising instructions that, when executed by a processor of a server, cause the server to:
identify a vehicle associated with a dealership to be audited via a database;
request for vehicle status of the vehicle as identified via a wireless network;
receive the vehicle status including vehicle locations from the vehicle as requested;
responsive to verifying the vehicle location is outside a predefined geofence associated with the dealership, obtain an electronic paperwork stored in the vehicle, the electronic paperwork including a vehicle title, and a vehicle registration;
obtain a transaction record for the vehicle from the dealership;
analyze the electronic paperwork and the transaction record to verify a suspicious transaction;
responsive to verifying both the electronic paperwork and the transaction record indicative of the suspicious transaction, raising a flag for the vehicle; and
responsive to raising the flag for the vehicle, send an instruction executable by an autonomous driving controller to direct the vehicle to autonomously drive to a predefined location.

18. The non-transitory computer-readable medium of claim 17, further comprising instructions that, when executed by a processor of a server, cause the server to analyze the vehicle status and generate an audit report.

* * * * *